(12) United States Patent
Belt

(10) Patent No.: US 6,405,778 B1
(45) Date of Patent: Jun. 18, 2002

(54) APPARATUS FOR PRODUCING A PRE-LOADED MERCHANDISER

(75) Inventor: James G. Belt, Holland, OH (US)

(73) Assignee: Rudolph Foods Company, Inc., Lima, OH (US)

( * ) Notice: Subject to any disclaimer, the term of this patent is extended or adjusted under 35 U.S.C. 154(b) by 0 days.

(21) Appl. No.: 09/526,648

(22) Filed: Mar. 15, 2000

(51) Int. Cl.$^7$ .............................. B32B 31/00; A47F 5/00
(52) U.S. Cl. ....................... 156/519; 156/252; 156/253; 156/265; 156/302; 156/513; 156/521; 156/522; 156/552; 156/566; 156/567; 248/317; 53/393; 206/736; 206/482; 211/49.1; 211/85.4; 211/85.15; 211/113
(58) Field of Search ................................. 156/302, 513, 156/518, 520, 521, 522, 530, 265, 252, 253, 552, 566, 519; 248/317; 53/393; 206/736, 482; 211/49.1, 85.4, 85.15, 113

(56) References Cited

U.S. PATENT DOCUMENTS

| | | | | |
|---|---|---|---|---|
| 1,909,841 A | * | 5/1933 | Perryman | 156/261 |
| 3,850,724 A | * | 11/1974 | Lehmacher | 156/201 |
| 4,817,805 A | | 4/1989 | Rodriquez | 211/71 |

* cited by examiner

Primary Examiner—Linda Gray
(74) Attorney, Agent, or Firm—John C. Purdue; David C. Purdue

(57) ABSTRACT

A pre-loaded, disposable merchandiser, a machine for producing the merchandiser and methods for producing the merchandiser and for packaging items to be sold for display. The merchandiser comprises a strip, a hanger at one end of the strip for suspending the strip, and a plurality of items to be offered for sale, adhesively connected to the strip in staggered locations on the strip. Apparatus for producing the merchandiser comprises a strip material feeder operable to deliver or feed strip material to a station, a tape arm operable to advance tape, a tape cutter operable to cut off a piece of the tape, and an install pad operable to apply the piece of tape to a portion of the strip and to a portion of an item to be sold or to packaging for the item. In a method for producing the merchandiser, the items to be sold and strip material are delivered to the station, tape is advanced through the tape arm, and the tape cutter and the install pad are advanced to cut off a piece of the tape and to engage the piece of tape. The install pad is advanced to apply the piece of tape to a portion of the strip material and to a portion of the item or the packaging for the item. The strip material with the item secured thereto is advanced and a fresh portion of the strip material and a new item are delivered to the station and the previously recited steps are repeated until a desired number of items are supported on the strip. The strip material is cut to release a loaded merchandiser from the strip material.

3 Claims, 7 Drawing Sheets

APPARATUS FOR PRODUCING A PRE-LOADED MERCHANDISER

BACKGROUND OF THE INVENTION

1. Field of the Invention

The present invention relates generally to merchandisers, articles useful for displaying a plurality of items for sale, typically positioned in retail outlets to maximize impulse purchasing. More specifically, the present invention is concerned with a pre-loaded, disposable merchandiser, as well as apparatus and a method for producing such merchandisers.

2. Description of the Prior Art

Strip merchandisers are known. Many comprise a strip of material having means for suspending the strip from the top and a plurality of hooks or fingers for supporting an apertured item offered for sale. These types of merchandisers are reusable. After the merchandise has been removed, new merchandise is hung from the strip. This is a time consuming task for delivery people and clerks who reload these strips. Breakage is a frequent problem with commercial, reusable merchandisers requiring replacement.

During a search of the Patent and Trademark Office web site bibliographic patent database, directed to the present invention, the following patents were noted: U.S. Pat. No. 3,954,049 (Brieske) entitled Method of Making Flexible Bag; U.S. Pat. No. 4,378,903 (Sherwood) entitled Hanging Tab With Single Line of Adhesive and Hanging Hole Clear of Adhesive; U.S. Pat. No. 4,546,943 (Fast) entitled Strip Merchandiser: U.S. Pat. No. 4,767,012 (Simmons) entitled Strip Hanger; U.S. Pat. No. 4,817,805 (Rodriquez) entitled Apparatus for Securing, Displaying and Dispensing of Envelope Package Goods; U.S. Pat. No 4,823,489 (Cea) entitled Method of Making a Three Dimensional Composite Display Card; U.S. Pat. No. 4,911,392 (Fast) entitled Strip Merchandiser with Reinforcement Section; U.S. Pat. No. 5,199,578 (Pendergraph et al.) entitled Clip Strip for Supporting Multiple Packages and Display Assembly Using Same; U.S. Pat. No. 5,248,036 (Radocha, Sr., et al.) entitled Strip Type Point-of-Sale Display Unit; U.S. Pat. No. 5,284,259 (Conway, et al.) entitled Two Sided Merchandising Strip; U.S. Pat. No. 5,339,967 (Valiulis) entitled Strip Merchandiser; U.S. Pat. No. 5,386,916 (Valiulis) entitled Adjustable Strip Merchandiser; U.S. Pat. No. 5,469.959 (Gummer) entitled Hosiery Display Package; U.S. Pat. No. 5,553,721 (Gebka) entitled Reversible Strip Merchandiser; U.S. Pat. No. 5,598,922 (Good) entitled Product Display Hanger; U.S. Pat. No. 5,678,699 (Gebka) entitled Strip Merchandiser Hanger and Label Holder; U.S. Pat. No. 5,683,003 (Gebka) entitled Strip Merchandiser Hanger and Label Holder; U.S. Pat. No. 5,762,212 (Pomerantz) entitled Display Strip Merchandiser; U.S. Pat. No. D412,721 (DeFelice) entitled Merchandising Strip; and U.S. Pat. No. 5,957,422 (Shea) entiled Reinforced Strip Display Assembly Capable of Supporting High Volumes of Smaller impulse Merchandise.

The Rodriquez Patent discloses apparatus for securing, displaying and dispensing envelope package goods. The apparatus comprises a securing strip, a masking strip and adhesive between the two strips. Adhesive for securing a package to the apparatus is applied to the securing strip and is presented through apertures in the masking strip so that packages may be pressed against the exposed adhesive, thereby releasably securing the package to the apparatus. Thus, the Rodriquez apparatus comprises two strips and packages are secured directly to adhesive which, in turn, is secured directly to the securing strip. This requires fairly precise alignment between packages and apertures in the masking strip for securing packages to the strip.

SUMMARY OF THE INVENTION

The present invention is based upon discoveries of a pre-loaded, disposable merchandiser, of a machine for producing the merchandiser, of methods for producing the merchandiser, and of methods for displaying items to be sold. The merchandiser comprises a strip, a hanger at one end of the strip for suspending the strip from something, and a plurality of items to be offered for sale, adhesively connected to the strip in staggered locations on the strip. Apparatus for producing the merchandiser comprises a strip material feeder operable to deliver or feed strip material to a station to which items to be sold are also delivered, a tape arm operable to advance tape, a tape cutter operable to cut off a piece of the tape, and an install pad operable to apply the piece of tape to a portion of the strip and to a portion of an item to be sold or to packing for the item. In a method for producing the merchandiser, the items to be sold are delivered to the station of the apparatus and so is the strip material until the next item is adjacent to a portion of the strip material. Tape is advanced through the tape arm and the tape cutter and the install pad are advanced to cut off a piece of the tape and to engage the piece of tape. The install pad is advanced to apply the piece of tape to a portion of the strip material and to a portion of the item or the packaging for the item. The strip material with the item secured thereto is advanced and a fresh portion of the strip material is delivered to the station. A new item is delivered to the station as well, and the previously recited steps are repeated so that a new piece of tape is applied to the fresh portion of the strip material and to a potion of the next item or packaging for the item. Additional items are secured to successive portions of tile strip material until a desired number of items are supported on the strip. The strip material is cut to release a loaded merchandiser from the strip material. Preferably, an aperture is punched or formed in the strip at the end from which it is desired to hang the strip. In that case, the portion of the strip adjacent to the aperture constitutes a banger which can support the merchandiser on a hook or the like. Other hangers may certainly be employed. A merchandiser according to the present invention is disposable and comprises a minimal amount of material. A person charged with stocking items loaded on a merchandiser according to the present invention can stock a plurality of the items by hanging a single merchandiser.

Accordingly, it is an object of the present invention to provide a pre-loaded merchandiser which makes restocking and item as simple as hanging the merchandiser somewhere.

It is a further object of the present invention to provide an apparatus for producing the merchandiser which is pre-loaded with items to be sold.

It is yet another object of the present invention to provide a method for producing a pre-loaded merchandiser.

These and other objects and advantages of the present invention will no doubt become apparent to those skilled in the art after having read this detailed description of the invention including the following description of the preferred embodiment which is illustrated by the various figures of the drawing.

DETAILED DESCRIPTION OF THE PREFERRED EMBODIMENTS

Figure 1:
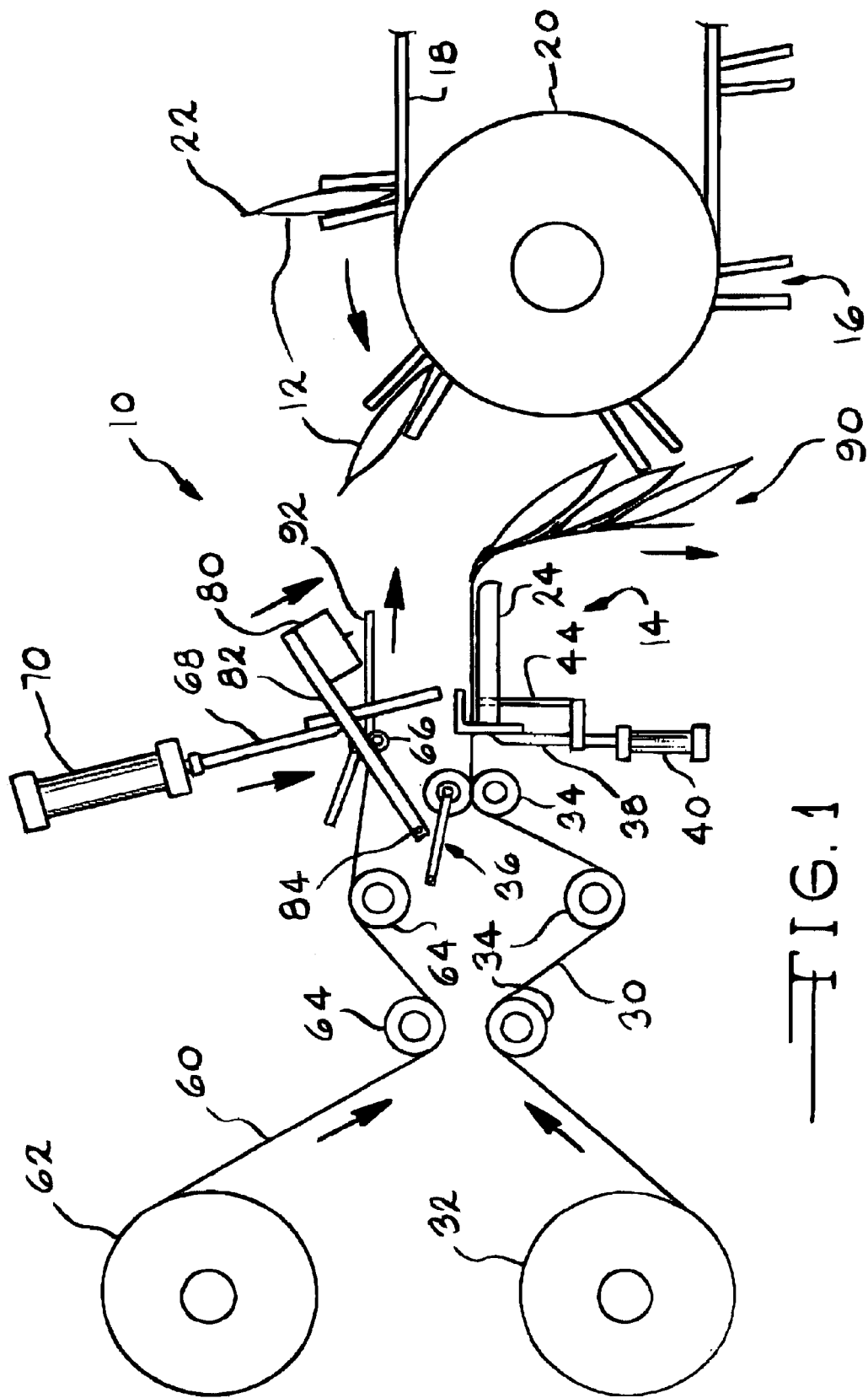
FIG. 1 is a side view of apparatus according to the present invention for producing pre-loaded merchandisers, as strip material and tape are advanced to a station.

Referring to FIGS. 1 through 4, apparatus according to the present invention for producing a pre-loaded merchandiser is indicated generally at 10. Items 12 are advanced towards a station, indicated generally at 14. The items 12 can be one of thousands of products from pork rinds to tape, to aspirin, to antacids, and beyond. In FIGS. 1 through 4, the items 12 are illustrated as being snack bags each having flattened sealed ends 22.

The items 12, in the illustrated embodiment, are carried in pockets 16 which support the items 12 on a conveyor 18 which turns around a roller 20. It will be appreciated that certain economies of manufacture can be realized if items 12 are supplied to the apparatus 10 as they are produced i.e., in-line with the manufacturing and/or packaging of a product constituting the items 12. In any case, the items 12 are advanced, right to left in FIGS. 1 through 4, towards the station 14, until an end 22 of a next item N (FIG. 1) is supported on a base 24.

Strip material 30 is supplied from a roll 32 and passes over rollers 34 and is delivered to the station 14 where a portion of it is supported on the base 24. An advancer, indicated generally at 36, is operable, in a first mode, and inoperable, in a second mode, to advance a new portion of the strip material 30 into the station. It will be appreciated that the advancer may further comprise a counter or sensor (not shown) to provide information about the position of the strip material 30 in the apparatus 10. The strip material may comprise a polymeric material. A preferred strip material is a thin polyester film and it can have a thickness of 7 thousandths of an inch. A suitable width is one and one half inches. These dimensions can be varied widely, within the scope of the present invention, depending on the requirements of a particular application.

Figure 4:
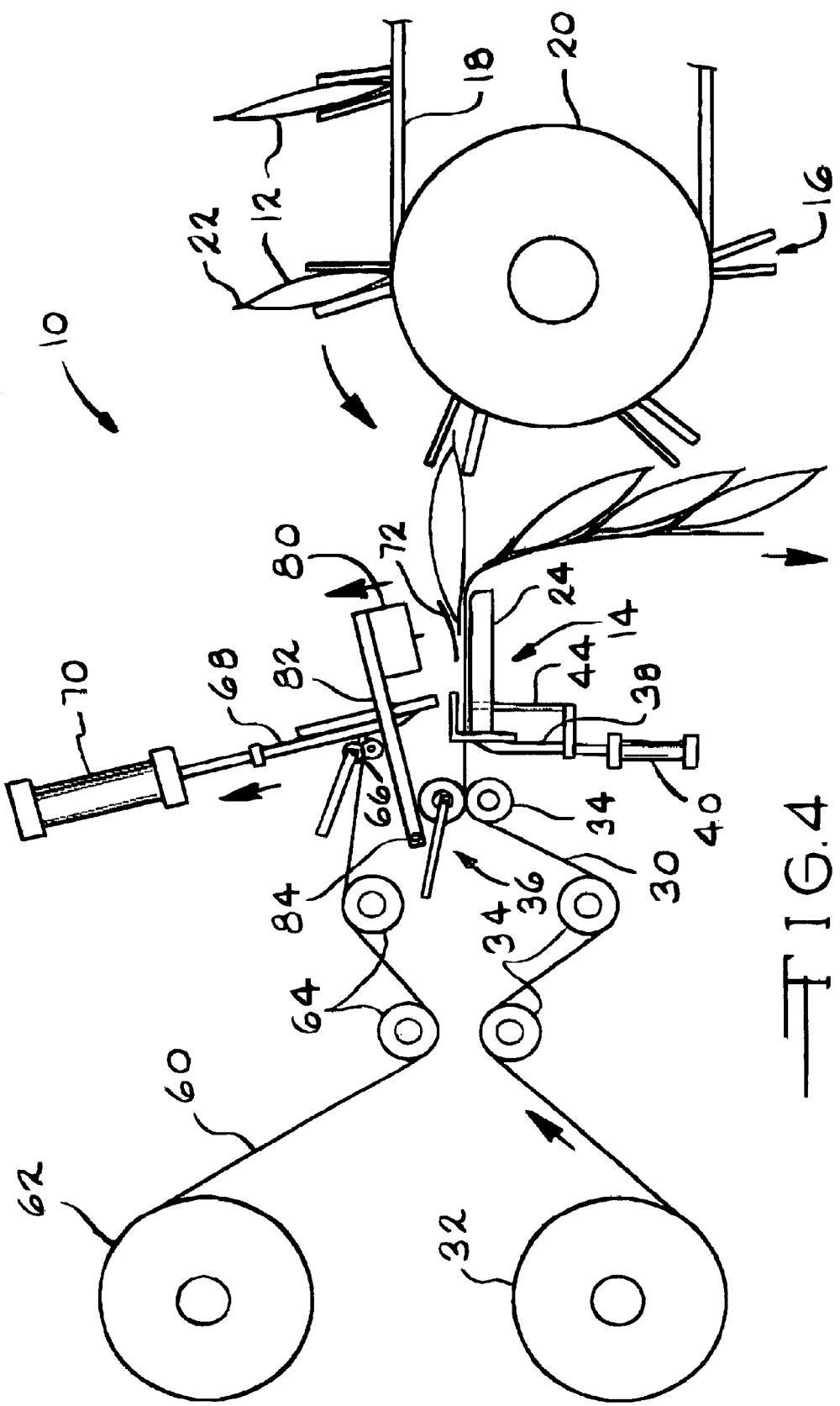
FIG. 4 is a side view of the apparatus shown in FIGS. 1 through 3 as a new item is delivered to the station strip material is advanced and the install pad is withdrawn along with the tape cutter.
Figure 5:
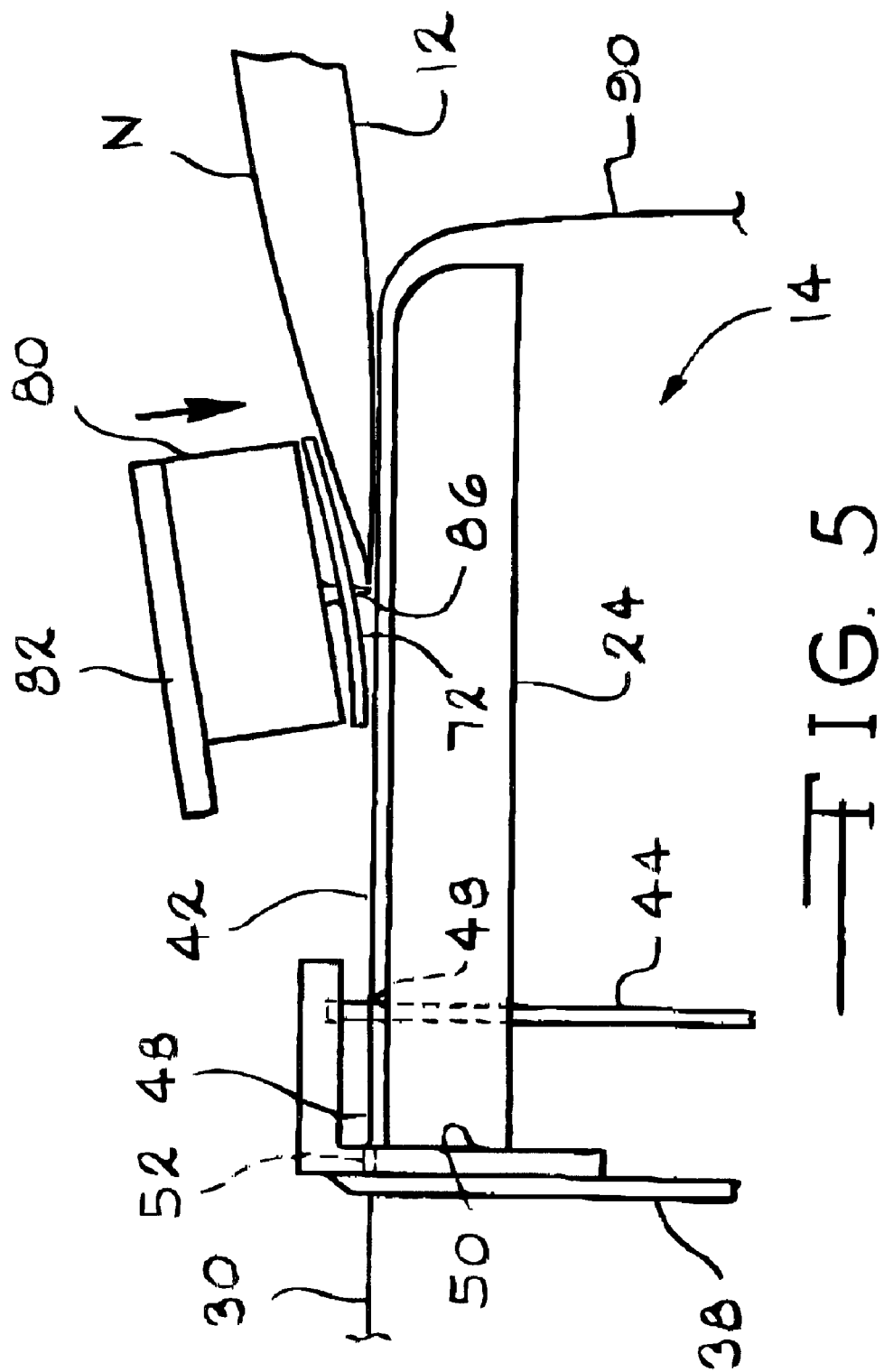
FIG. 5 is a detail view of a portion of the apparatus shown in FIGS. 1 through 4, as the install pad applies a piece of tape to portions of the strip material and to the item, and a pre-loaded merchandiser is severed from the strip material.
Figure 6:
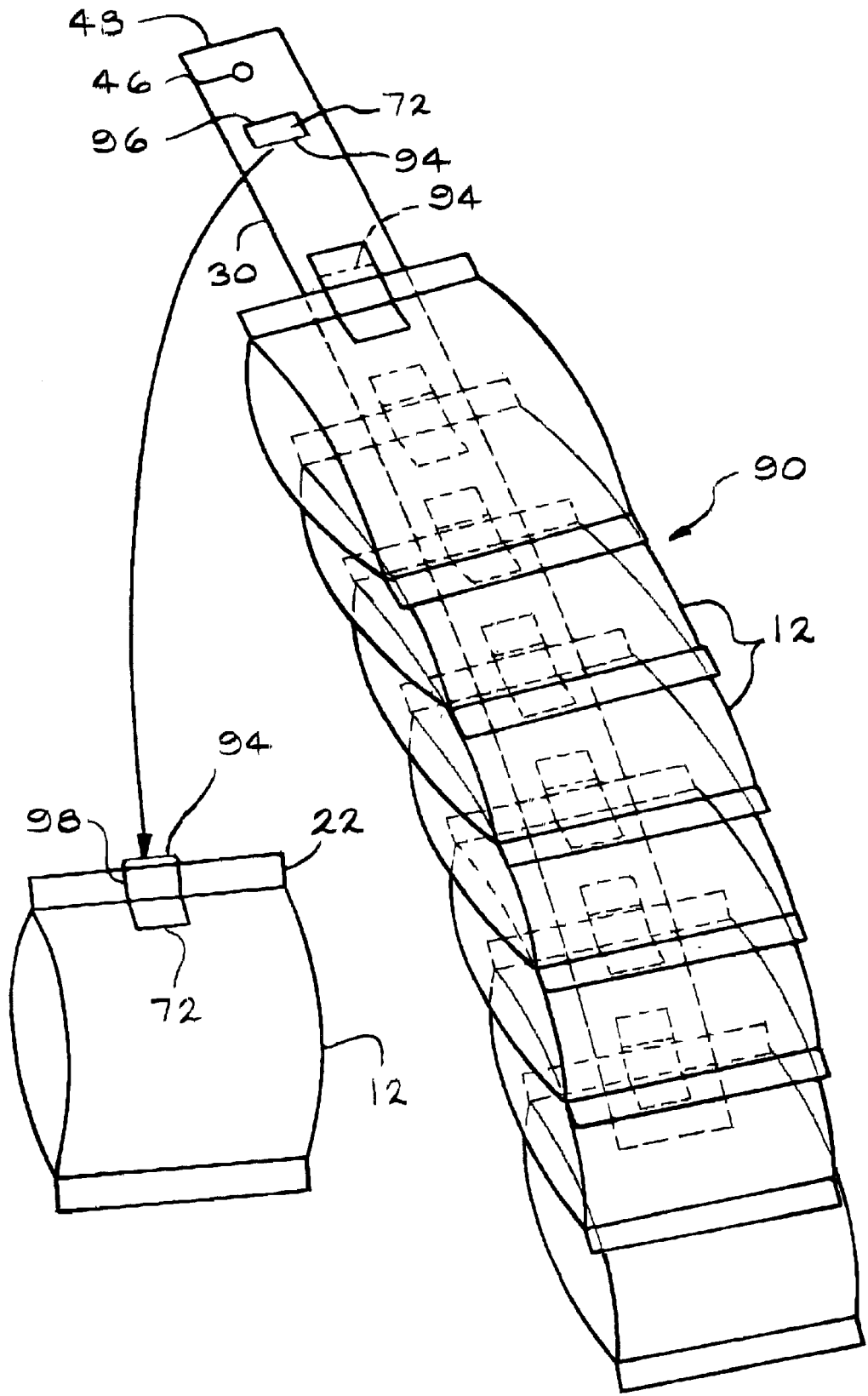
FIG. 6 is a perspective view of a merchandiser according to the present invention.

The apparatus 10 further comprises a strip material cutter 38 for cutting strip material 30. The cutter 38 is supported on an actuator 40 for reciprocating movement between a first, retracted position (FIGS. 1 trough 4) and a second, extended position (FIG. 5). Referring to FIG. 5, in traveling from the first position to the second position, the cutter 38 is operable to cut through the strip material 30, severing a strip 42 from the strip material 30. A punch 44 is supported on the actuator 40 (FIGS. 1 through 4) for reciprocating movement with the cutter 38 between a first, retracted position (FIGS. 1 through 4) and a second, extended position (FIG. 5). In moving from the first to the second position, the punch 44 is operable to form a hole 46 (FIGS. 5 and 6) in the strip 42, near a first end 48 thereof. An anvil 50 including a strip guide 52, is supported on the base 24 and cooperates with the cutter 38 and the punch 44 in a known fashion.

Tape 60 is supplied from a roll 62, passes over rollers 64 and is delivered to the station 14. The tape also passes through a tape advancer comprises cooperating V-drive serrated pulleys 66 which advance the tape 60, as needed, into the station 14. Counters and/or sensors (not shown) may be associated with the tape delivery system to provide information about the position of the tape 60 in the apparatus 10. A suitable, single sided adhesive tape is one available from 3M under the designation 375. It is about one inch wide. Many adhesive tapes are suitable for use in producing merchandisers according to the present invention.

Figure 2:
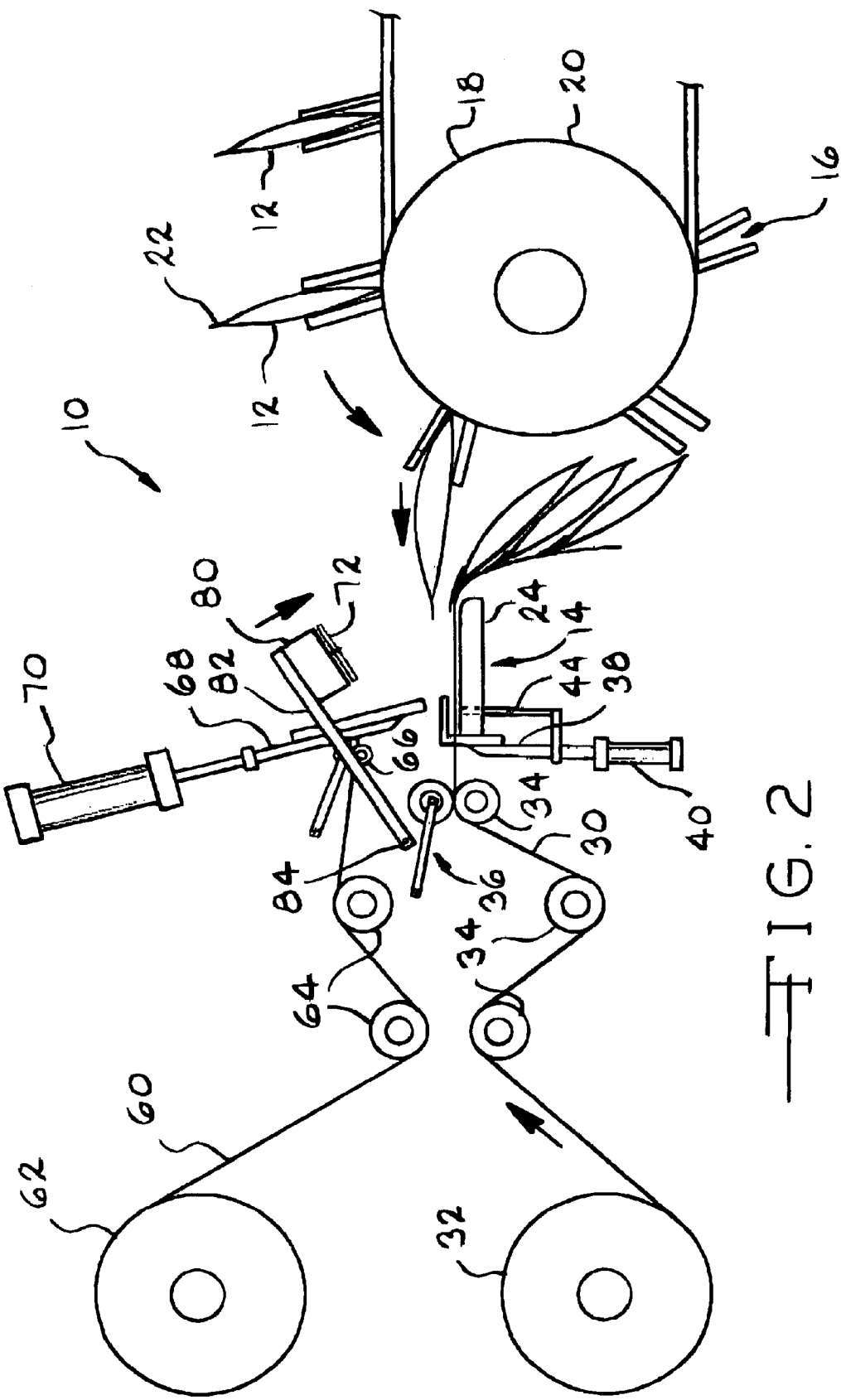
FIG. 2 is a side view of the apparatus shown in FIG. 1 as a piece of tape is cut from a tape and held on an install pad.
Figure 3:
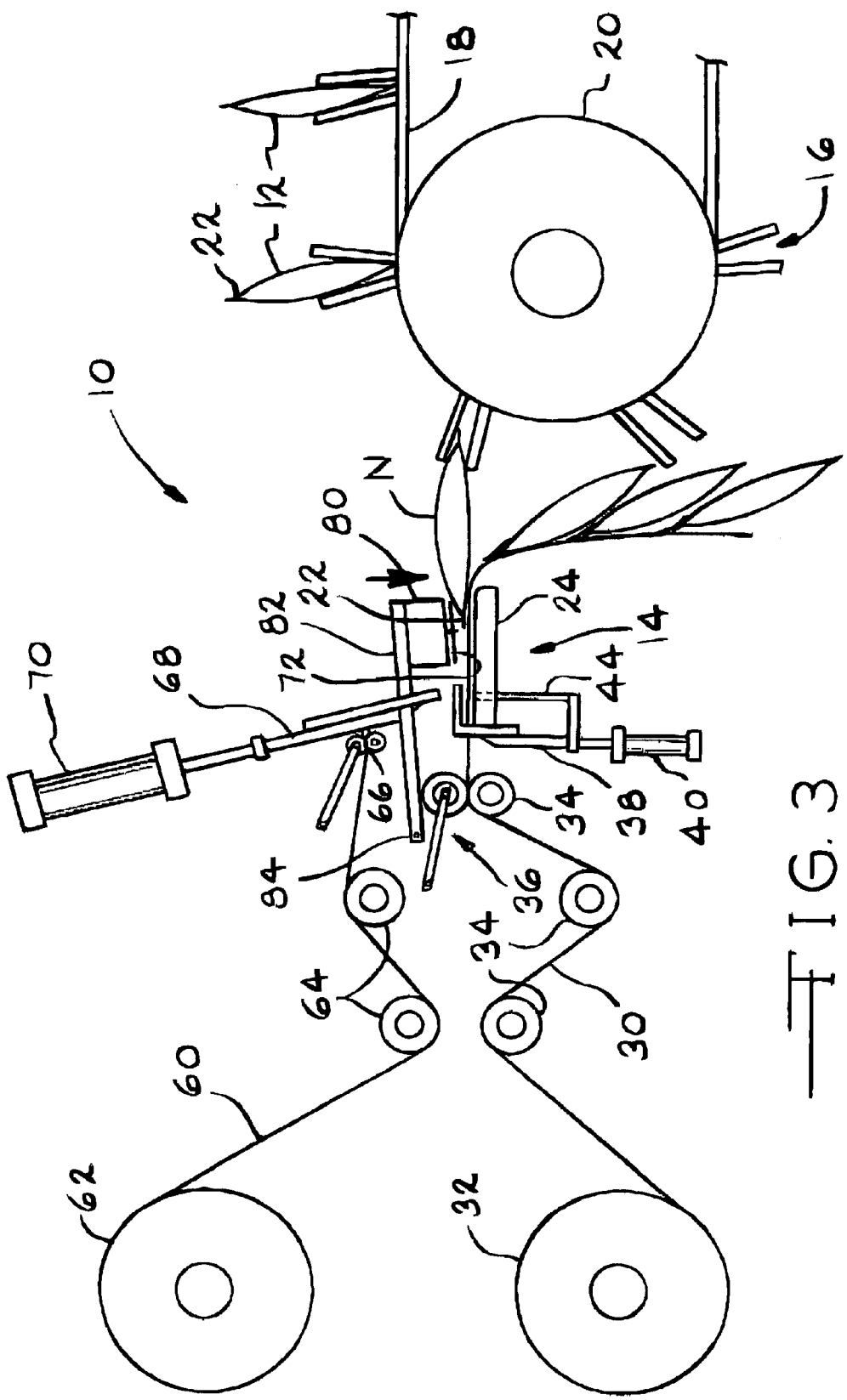
FIG. 3 is a side view of the apparatus shown in FIGS. 1 and 2 as the piece of tape is applied to a portion of the strip material and to a portion of an item.

The apparatus 10 further comprises a tape cutter 68 for cutting tape 60. The cutter 68 is supported on an actuator 70 for reciprocating movement between a first, retracted position (FIG. 1) and a second, extended position (FIGS. 2 through 4). In traveling from the first position to the second position, the tape cutter 68 is operable to cut through the tape 60, severing a piece of tape 72 from the tape 60.

A tape install pad 80 is supported on an arm 82 which is supported for pivotal movement about a pivot support 84 between a first, retracted position (FIGS. 1 and 2) and a second, extended position (FIG. 3). In moving from the first to the second position, the install pad 80 is operable to engage and hold the piece of tape 72 after it is severed from the tape 60. The install pad 80 can be provided with a vacuum tape retainer system (not shown) or other means for holding a piece of tape momentarily. The install pad should be made of a relatively resilient material so that a fairly uniform pressure is applied to the tape piece 72. A perf cutter 86 (best seen in FIG. 5) is supported on the install pad 80, if desired, for reasons discussed below.

The operation of the apparatus 10 to produce a merchandiser 90 (FIG. 6) will now be described. In FIG. 1, there is a portion of a merchandiser 90 hanging down from the right side of the base 24. First, the steps involved in adding a next item 12 to the partial merchandiser 90 will be set forth.

After an item 12 has been gaped to the strip material 30, the install pad arm 82 pivots to the first, retracted position shown in FIG. 1. The tape 60 is advanced, left to right, by and between the V-drive serrated pulleys. An end portion 92 of the tape extends to the right of the V-drive pulleys 66. Although the end 92 is suspended in air, it has a V-shape in cross section and is self supporting. The strip material 30 is also advanced, left to right, until the last item taped to the strip material is removed from the station 14, as shown in FIG. 1. A next item 12 is advancing, in a pocket 16, right to left, towards the station 14.

In FIG. 2, the apparatus is illustrated after the next item 12 has advanced into the station and after the tape cutter 68 has severed a piece of tape 72 from the tape 60. The piece of tape 72 has been engaged by and is now held by the install pad 80. From this state, the next item 12 is positioned on the strip material 30, as shown in FIG. 3 and the install pad arm 82 is advanced toward the second position until it applies the piece of tape to a portion of the strip material 30 and to a portion of the item 12. In this case, the piece of tape 72 is applied to the end 22 of the item 12. It is noted that in FIG. 3, where this state is illustrated, the tape piece 72, the strip material 30 and the end 22 of the item 12 have been spaced for clarity.

A next item can now be added to the strip material 30 or, if the previous item 12 was to be the last item, a pre-loaded merchandiser can be severed from the strip material 30. A next item 12 is added by returning the apparatus 10 to the FIG. 1 position. In FIG. 4, the apparatus 10 is illustrated in an intermediate state as the install pad arm 82 is returning to its retracted position. The previously attached item 12 is about to fall out of its pocket 16 and the strip material 30 is being advanced, left to right, to remove the previously attached item 12 out of the station 14. As these actions continue, tape 60 is advanced, left to right, until a new end 92 is extended, and the FIG. 1 state is reached again. The preceding sequence can then be repeated until a desired number of items 12 have been taped to the strip material 30.

After the last item 12 for a given merchandiser has been attached to the strip material 30, the actuator 40 and the cutter 38 are advanced to the second position and, en route, the cutter 38 severs the strip material, creating a merchandiser 90. The punch 44 pierces the strip material 30, on the merchandiser side of the cut, producing a hole indicted at 46 in FIG. 6 near the end 48 of the merchandiser 90 which serves as a hanger for the merchandiser 90.

It will be appreciated that the control of the operation of the elements of the apparatus 10 may be carried out with known controllers, and it is specifically contemplated that micro-processors (not shown) may be utilized to control and regulate the operation of the apparatus 10. Such controllers are well known to those skilled in the art, as are the application of such controllers to control the apparatus 10 operation in the manner described above. Accordingly, such controllers will not be further described herein.

Returning now to FIG. 5, the perf cutter 86 will now be further described. The perf cutter 86 extends out of the face of the install pad 80 so that, when the install pad arm reaches the second, extended position, the perf cutter 86 perforates, the tape piece 72, adjacent to the end 22 of the item 12, producing perforations. The perforations formed in the tape piece 72 serve to facilitate the removal of an item 12 from the merchandiser 90, as shown clearly in FIG. 6, where downward force applied to an item has caused the tape piece 72 to split into a first, strip portion 96, which remains on the merchandiser and a second, item portion 98, which remains on the item after it is removed from the merchandiser. For a given tape, a perf cutter can be selected that will perforate the tape piece 72 to the extent that the tape piece 72 is operable to hold items 12 fast to the strip 30 until a consumer exerts comfortable, firm downward force on the item 12, causing the tape piece 72 to split and the item to be removed from the merchandiser 90 for sale. With the 3M tape referred to above, good results have been achieved with a perf cutter for producing dotted perforations which are a few thousandths of an inch in diameter and about sixty thousandths of an inch apart.

Figure 7:
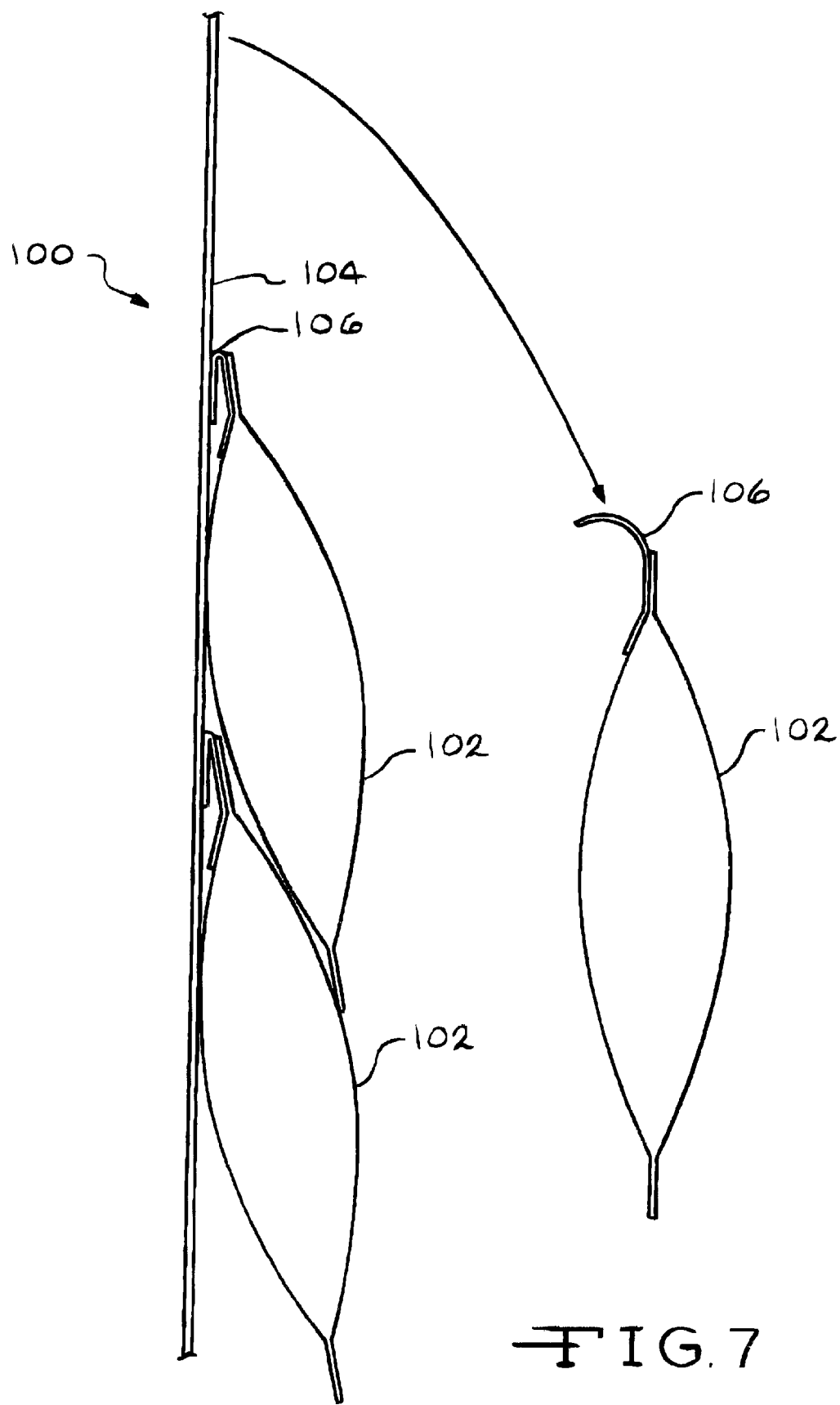
FIG. 7 is a side view of a second embodiment of a merchandiser according to the present invention.

Another embodiment of a merchandiser according to the present invention is indicated at 100 in FIG. 7. Items 102 are secured to a strip material 104 by tape pieces 106. The merchandiser 100 can be produced on apparatus corresponding with apparatus 10, if it is modified so that the positions of the cutter 38 and the punch 44 are reversed, whereby a hanger would be formed in what would be the upper end (not shown) of the merchandiser 100 as illustrated in FIG. 7. It can be seen in FIG. 7 that the tape pieces 106 are folded over on themselves. These pieces 106 may be perforated or not, as desired.

The foregoing detailed description is intended to enable one skilled in the art to practice the present invention and it sets forth the best modes presently known to the inventor for carrying out the invention. It will certainly be appreciated that the true scope of this invention goes beyond the scope of the foregoing detailed description and that the scope of the invention is to be determined with reference to the following claims.

I claim:

1. Apparatus for producing at merchandiser for displaying a plurality of saleable items each of which has an edge portion which is releasably attached to an elongated strip, whereby a purchaser for one of the items can remove a single item from the merchandiser for purchase, said apparatus comprising:

(1) a base for supporting a portion of the elongated strip and an edge portion of one of the items;

(2) conveyor for successively moving single ones of a plurality of the items toward said base and positioning the edge portion of the moved item on said base and adjacent the strip thereon;

(3) a cutter for cutting a predetermined length of adhesive tape, the predetermined length being sufficient to adhere the edge portion of one of the items to the strip;

(4) an install pad operable to hold the predetermined length of adhesive tape, to move the predetermined length to a position where it is partially over the edge portion and partially over a part of the strip adjacent the edge portion, and to press the predetermined length between said install pad and said base so that the predetermined length of adhesive tape releasably adheres the edge portion of the item to the strip;

(5) a strip mover for advancing the elongated strip relative to said base to a position where a new portion of the strip is supported on said base so that the edge portion of the next item moved by said conveyor toward said base is adjacent the new portion of the strip and said install pad is operable to hold, move and press a subsequent predetermined length of adhesive tape to releasably adhere the edge portion of the next item to the new portion of the strip; and (6) a strip cutter for cutting the elongated strip after a number of the items are attached to a length of the strip to form the merchandiser.

2. The apparatus claimed in claim 1, which further comprises a punch operable to punch a hole in an end of the strip.

3. The apparatus claimed in claim, 1, which further comprises a perf cutter for perforating the predetermined lengths of adhesive tape.

* * * * *